United States Patent [19]

Iwamoto et al.

[11] Patent Number: 4,853,874
[45] Date of Patent: Aug. 1, 1989

[54] MASTER-SLAVE MANIPULATORS WITH SCALING

[75] Inventors: Taro Iwamoto, Mito; Tatsu Aoki; Kichio Nakajima, both of Ibaraki; Hiroshi Yamamoto, Tsuchiura, all of Japan

[73] Assignee: Hitachi, Ltd., Tokyo, Japan

[21] Appl. No.: 123,276

[22] Filed: Nov. 20, 1987

[30] Foreign Application Priority Data

Dec. 12, 1986 [JP] Japan .................................. 61-294832

[51] Int. Cl.⁴ .............................................. B25J 3/00
[52] U.S. Cl. ...................................... 364/513; 414/2; 901/4; 901/8
[58] Field of Search ........................ 364/513; 318/568; 414/1-5; 901/2-5, 8

[56] References Cited

U.S. PATENT DOCUMENTS

| 4,148,403 | 4/1979 | Riffe | 414/2 |
| 4,298,300 | 11/1981 | Francois et al. | 414/2 |
| 4,661,032 | 4/1987 | Arai | 901/8 |

FOREIGN PATENT DOCUMENTS 2185593  7/1987  United Kingdom ................. 414/2

OTHER PUBLICATIONS

Bilateral Control for Manipulators with Different Configerations; Arai et al; IECON '84; 1984.

*Primary Examiner*—Allen MacDonald
*Attorney, Agent, or Firm*—Antonelli, Terry & Wands

[57] ABSTRACT

In a controlling apparatus of a manipulator equipped with a master arm and a slave arm, a processing device is provided for effecting scale conversion calculation of a calculation result representing the position data of the master arm for expansion or reduction, and for outputting the result of this calculation to the slave arm.

19 Claims, 8 Drawing Sheets

MASTER-SLAVE MANIPULATORS WITH SCALING

BACKGROUND OF THE INVENTION

This invention relates generally to a master-slave type manipulator and more particularly, to a controlling apparatus of a master-slave type manipulator which will be suitable for carrying out various operations safely in an environment unendurable to people and in outer space.

In conventional master-slave type manipulators in general, there is the requirement that a master arm and a slave arm must have the same or similar configuration and hence, free design of an arm structure cannot be made.

Since remarkable progress in calculation of speed has resulted from advances in computer technology, real time calculation control of the manipulator, that has been difficult in the past, has become possible, and attempts have been made to change the analog servo control of the master-slave type manipulator which has been predominant in the past to computer control which can attain more complicated and higher control in order to improve maneuverability of the manipulator. As an example of such attempts, "IECON '84", p.p. 40–45 discloses a technique which permits the motion of a terminal of the master arm to correspond on a 1:1 basis to the motion of a terminal of the slave arm having a different configuration from the former through high speed coordinate transformation calculation using a computer.

In accordance with the prior art technique described above, the ratio of the motion of each arm is 1:1 in order to bring the reference coordinates of the master arm and the slave arm and the two points of the arm terminals into conformity with one another. Therefore, when a fine movement is to be carried out by the slave arm, the master arm must carry out the fine movement in the same way as the operation required for the slave arm and when a rough motion is required for the slave arm, on the contrary, the master arm, too, must carry out a rough motion. Accordingly, there is left the problem that maneuverability of the master arm is not high in response to the contact of the work of the slave arm.

In view of the background described above, the present invention is directed to provide a controlling apparatus of a manipulator which can improve maneuverability of the master arm in response to the content of the work of the slave arm.

SUMMARY OF THE INVENTION

In a manipulator equipped with a master arm and a slave arm which operates while following the motion of the master arm, the object of the present invention can be accomplished by a controlling apparatus equipped with a processing device which effects a scale conversion matrix calculation for expansion or reduction for a calculation result representing the position information of the master arm, and outputs the result of this calculation to the slave arm.

The processing device described above calculates the position information upon movement of the master arm, makes scale conversion matrix calculation for effecting predetermined expansion or reduction for the result of calculation of the position information, and outputs the result of this calculation to the slave arm. Therefore, the slave arm is subjected to scale conversion with respect to the motion of the master arm and operates, so that the slave arm can make a fine or coarse operation with respect to motion of the master arm.

The above and other objects, novel features and advantages of the present invention will become more apparent from the following description when taken in conjunction with the accompanying drawings.

DETAILED DESCRIPTION OF THE PREFERRED EMBODIMENTS

Hereinafter, some preferred embodiments of the present invention will be described with reference to the accompanying drawings.

Figure 5:
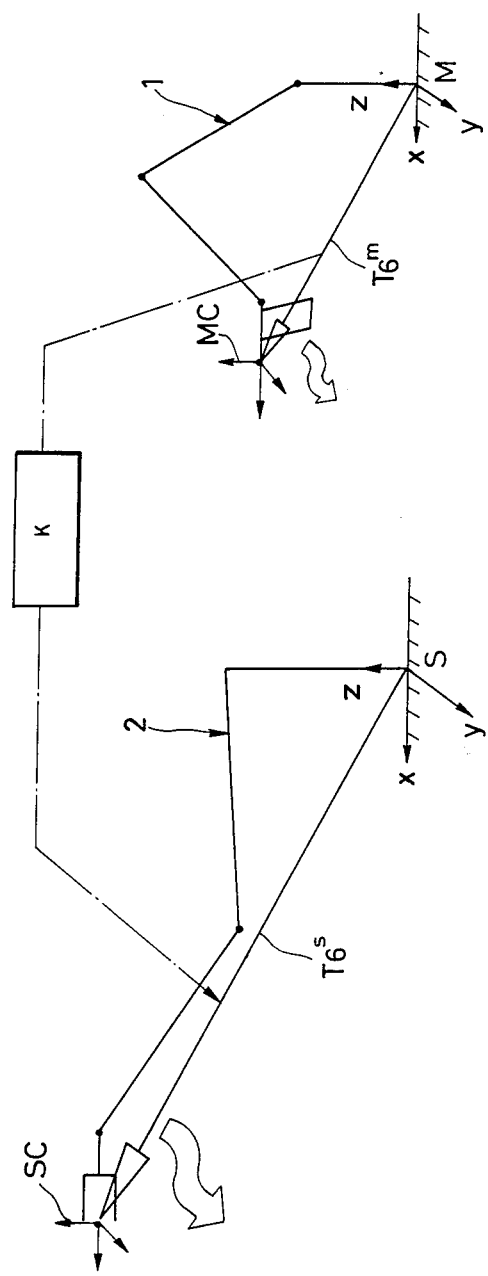
FIG. 5 is an explanatory view useful for explaining the principle of the apparatus of the present invention shown in FIG. 1.

First of all, the operation principle of the present invention will be described with reference to FIG. 5 prior to the description of the preferred embodiments thereof. In this drawing, reference numeral 1 represents a master arm equipped with a plurality of links connected to one another by joints and reference numeral 2 represents a slave arm equipped likewise with a plurality of links connected to one another by joints. In this example, the slave arm 2 has a different configuration from that of the master arm 1. It will be assumed hereby that the reference coordinate system of the master arm 1 is M, the coordinate transformation matrix from this reference coordinate system M to the terminal of the master arm 1 to $T6^m$, the reference coordinate system of the slave arm 2 is S, the coordinate transformation matrix from the reference coordinate system S to the terminal of the slave arm 2 is $T6^s$ and the scale conversion matrix between the coordinate transformation matrices $T6^m$ and $T6^s$ is K. Then, the coordinate conversion calculation is made in the following sequence.

The coordinate transformation matrix $T6^m$ to the terminal of the master arm can be determined from the parameter of each link of the master arm 1 and the position of each link connecting shaft. Next, the coordinate conversion calculation containing the scale conversion between the coordinate transformation matrix $T6^m$ to the terminal of the master arm and the coordinate transformation matrix $T6^s$ to the terminal of the slave arm is expressed by the following formula (1):

$$T6^s = K\, T6^m \tag{1}$$

If K is assumed hereby as follows, $$K = \begin{pmatrix} a & 0 & 0 & 0 \\ 0 & b & 0 & 0 \\ 0 & 0 & c & 0 \\ 0 & 0 & 0 & 1 \end{pmatrix} \tag{2}$$

then $T6^s$ is the product obtained by multiplying $T6^m$ by a in the x axis of the reference coordinate system M of the master arm 1, by b in its y axis and by c in its z axis. If expansion is to be made equally in the three axial directions, a=b=c. Next, the link parameter of the slave arm 2 is given to the conversion matrix $T6^s$ obtained from the afore-mentioned formula (1), and the reference value of each axis of the slave arm is determined from the inverse coordinate transformation calculation. If each axis is subjected to servo control with respect to the reference value of each axis of the slave arm 2 obtained in this manner, the slave arm 2 can be operated while the motion of the master arm 1 can be expanded or reduced arbitrarily within the motion space of each arm irrespective of the configuration of the arm.

Next, the controlling apparatus in accordance with the present invention based on the principle of the invention described above will be explained with reference to FIG. 1. In this drawing, reference numeral 1 represents the master arm and reference numeral 2 indicates the slave arm. In this embodiment, the slave arm 2 has a different configuration from the master arm. Reference numerals 3A to 3C present position sensors disposed at the joint axes of the master arm 2, 4 is a sensor data interface and 5 is a processing device which makes the calculation processing described above and determines the reference of each joint axis of the slave arm. Reference numeral 6 represents a servo controller, 7A to 7C are actuators disposed at the joint axes of the slave arm 2 and 8A to 8C are rotation sensors disposed at the joint axes of the slave arm 2.

Figure 2:
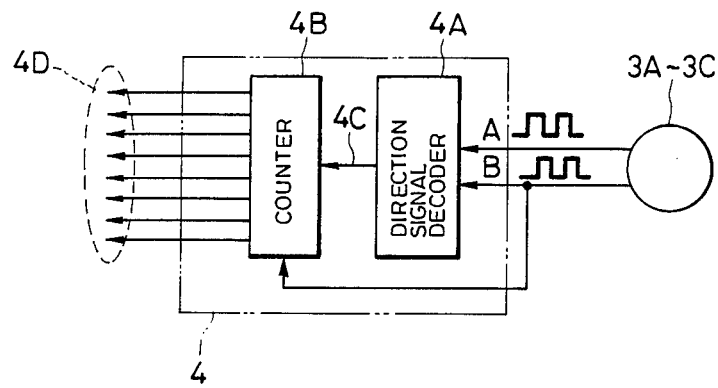
FIG. 2 is a structural view showing one example of a sensor data processor constituting the apparatus of the present invention.

Next, a definite construction of the sensor data interface 4 described above is shown in FIG. 2. In the drawing, a rotary pulse generator is used as each of the position sensors 3A to 3C. A set of pulse signals whose phases are deviated from each other by 90°, that is, phases A and B, are generated from the position sensors 3A to 3C in accordance with the rotary angle. The signals are inputted to a rotational direction detector 4A to judge the direction of the rotary angle. On the other hand, the signal of the phase A or B is applied to a counter 4B to count the pulse number. The direction signal outputted from the rotational direction detector 4A is inputted to the counter 4B to switch the increase and decrease of the pulse number. Therefore, since the value of the counter 4B is increased or decreased in accordance with the increase or decrease of the rotary angle, the rotary angle can be detected by reading from outside the output 4D of the counter 4B.

Figure 3:
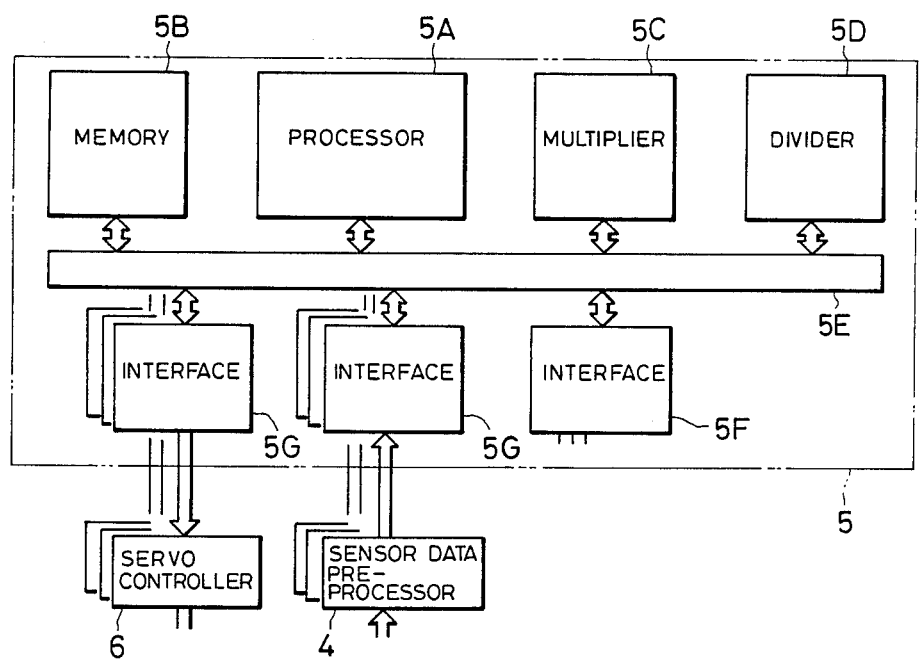
FIG. 3 is a block diagram showing a definite example of a processing device constituting the apparatus of the present invention.

FIG. 3 shows a definite structural example of the processing device 5. Connected inside the processing device 5 are a processor 5A for effecting input/output control and addition/subtraction, a memory 5B for storing data such as a trigonometric function table or link parameters of the manipulator, a multiplier 5C and a divider 5D through a bus 5E. Serial or parallel interface circuits 5F and 5G are further connected to this bus 5E. The sensor data interface 4 operating as a sensor data pre-processor for the position sensors and the servo controller 6 are connected to the interface circuits 5G. The processor 5A can access all the devices connected thereto through the bus 5E and can process data in accordance with a program.

Figure 4:
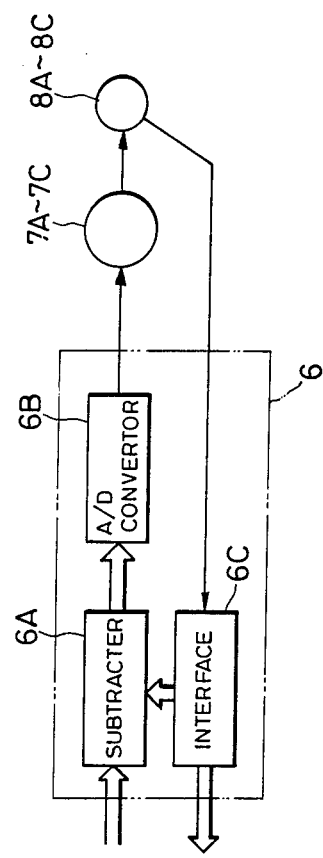
FIG. 4 is a block diagram showing an example of a servo control circuit constituting the apparatus of the present invention.

FIG. 4 shows a definite example of the servo controller 6. The output from the processing device 5 passes through the subtractor 6A, is converted to an analog signal by a digital/analog converter 5B and is then inputted to actuators 7A to 7C. These actuators 7A to 7C drive the joints of the arm and rotate the angle sensors 8A to 8C. The output signal from each angle sensor 8A to 8C is inputted to the interface 6C to generate an angle signal, which is read by the processor 5A through the parallel interface 5G shown in FIG. 3 and is inputted to the multiplier 5C. The output of the subtracter 6A is the difference between the reference signal outputted from the processing device 5 and the angle signal inputted from the angle sensor 8A to 8C through the interface 6C, and the actuators 7A to 7C are driven in such a manner that this difference becomes zero. In this manner, the joint angle of the slave arm 2 can be brought into conformity with the reference value.

Next, the operation of the controlling apparatus in accordance with one embodiment of the invention described above will be explained.

When the master arm 1 is operated, the angle of each joint of the master arm 1 is detected by a respective position sensor 3A to 3C. This detection signal is inputted to the processing device 5 through the sensor data pre-processor 4. The processing device 5 stores the relation of relative position of the terminal coordinate system MC of the master arm 1 to the reference coordinate system M of the master arm as to coordinate transformation matrix $T6^m$ and also stores the dimensional ratio of the motion of the terminal of the slave arm 2 with respect to the motion of the terminal of the master arm 1, that is, the scale conversion factor K. The processing device 5 makes the scale conversion calculation for the master arm coordinate transformation matrix $T6^m$ and obtains the slave arm coordinate transformation matrix $T6^s$.

Next, the joint angle reference value of the slave arm 2, when the relative position of the terminal coordinate system SC to the slave arm reference coordinate system S is brought into conformity with the slave arm coordinate transformation matrix $T6^s$, is calculated from the inverse coordinate transformation, and this value is outputted to the servo controller 6. The servo controller 6 drives the actuators 7A to 7C. In this manner, the motion of the terminal of the master arm 1 can be transmitted to the motion of the terminal of the slave arm 2 through scale conversion. As a result, the motion of the master arm 1 can be transmitted to the slave arm 2 within the motion space of each arm irrespective of its configuration by expanding or reducing arbitrarily the motion of the master arm 1. It is thus possible to cause a fine or coarse motion of the slave arm 2 with respect to the operation of the master arm 1.

Next, the controlling apparatus in accordance with another embodiment of the present invention will be described.

Figure 8:
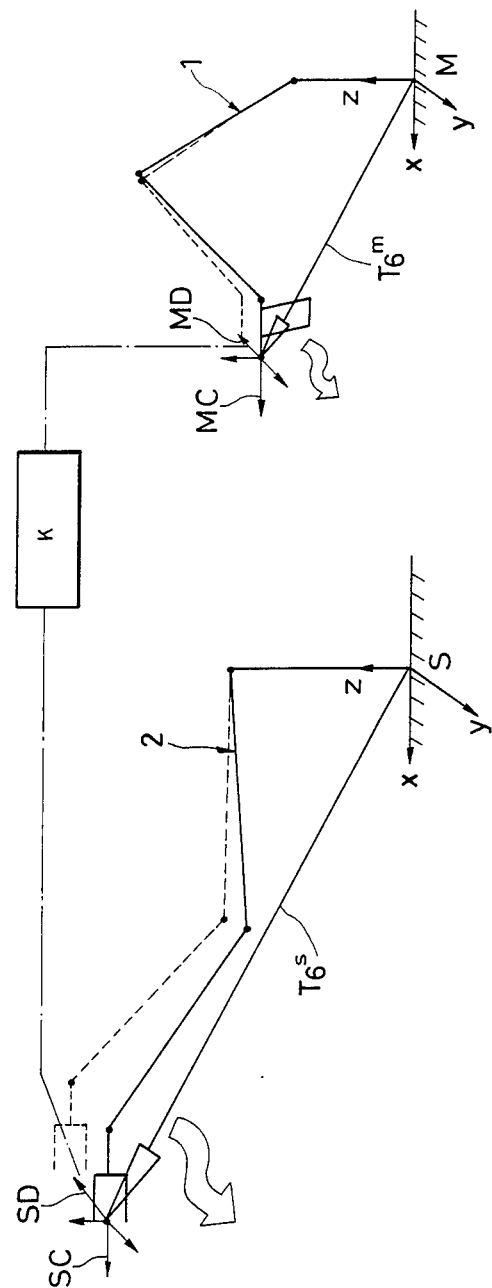
FIG. 8 is an explanatory view useful for explaining another embodiment shown in FIG. 6.

The principle of this embodiment will be explained with reference to FIG. 8 before the description of the embodiment. In this embodiment, the result of the scale conversion calculation of a fine displacement of the terminal position of the master arm 1 is transmitted as the fine displacement of the terminal of the slave arm 2 to the slave arm 2. In the same way as in the embodiment shown in FIG. 1, it will be assumed that the reference coordinate system of the master arm 1 is M, the coordinate transformation matrix from the reference coordinate system M to the terminal of the master arm 1 is $T6^m$ and the scale conversion matrix for the scale conversion calculation is K. If the reference coordinate transformation matrix of the slave arm 2 is assumed further as $T6^s$, then the sequence of the coordinate transformation calculation is as follows. Namely, the coordinate transformation matrix $T6^m$ can be determined from each link parameter of the master arm 1 and the position of each joint axis. The reference value of each axis of the slave arm 2 can be determined if each link parameter of the slave arm 2 and the coordinate transformation matrix $T6^s$ representing the position of its terminal are given.

It will be assumed that the motion of the master arm 1 is synchronised at a certain point of time with that of the slave arm 2, then the following equation can be established between the fine displacement dT6 of the terminal position and the fine displacement dQ of each axis of the manipulator:

$$dT6 = J \cdot dQ \tag{3}$$

where J is Jacobian matrix.

When the master arm 1 is caused to make fine motion MD, the fine motion $dT6^m$ of the terminal of the master arm 1 can be given from the following formula with $dQ^m$ representing the change of displacement of each joint axis of the master arm 1 and $J^m$ representing the Jacobian matrix of the master arm 1:

$$dT6^m = J^m \cdot dQ^m \tag{4}$$

Here, the fine motion $dT6^s$ of the terminal of the slave arm 2 is obtained from the following formula by subjecting $dT6^m$ to scale conversion:

$$dT6^s = K \cdot dT6^m \tag{5}$$

Next, the fine displacement $dQ^s$ of each joint axis of the slave arm 2 is obtained by solving the inverse matrix $(J^s)^{-1}$ of the Jacobian matrix of the slave arm 2. Namely, $$dQ^s = (J^s)^{-1} \cdot dT6^s \tag{6}$$

The fine displacement $dQ^s$ of each joint axis of the slave arm 2 thus obtained is added to the position of each joint axis of the slave arm 2 to obtain the reference value of each joint axis of the slave arm 2 by the servo controller.

Figure 6:
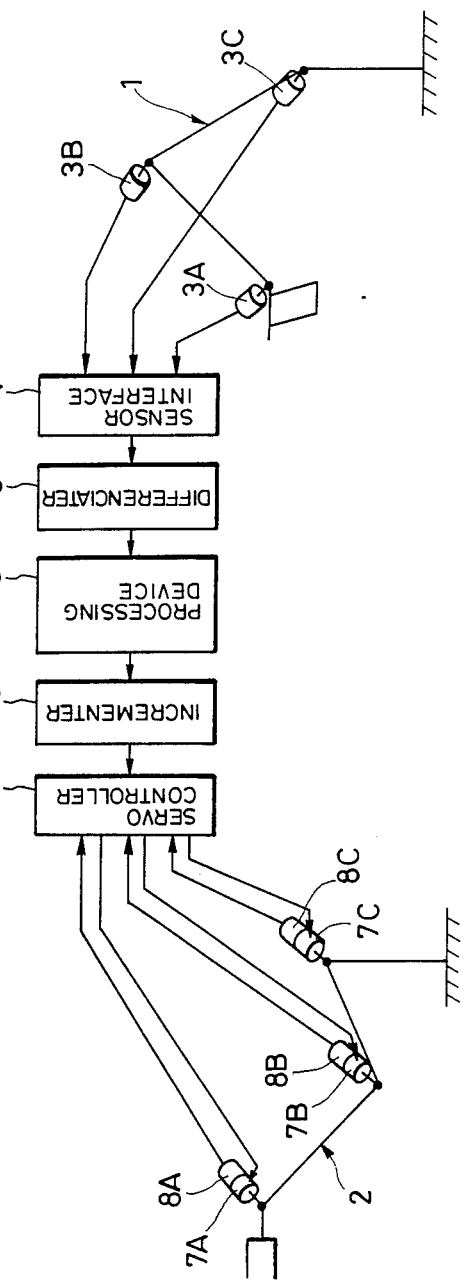
FIG. 6 is a block diagram showing the construction of the apparatus in accordance with another embodiment of the present invention.

The controlling apparatus in accordance with another embodiment of the present invention based on the principle of the invention described above will now be explained with reference to FIG. 6. In this drawing, like reference numerals are used to identify like or the same constituents as in FIG. 1. Reference numeral 9 represents a differentiater and 10 is an incrementer. The differentiater 9 detects the change quantity of the sensor signal of each sensor 3A to 3C at a sampling time. The processing device 5 carries out various calculations represented by the afore-mentioned formulas (3) to (6) to determine the amount of change of each joint angle of the slave arm 2 and outputs this change to the incrementer 10. The incrementer 10 adds the amount of change obtained by the processing device 5 to the current reference value of each joint axis of the slave arm 2 and inputs the result of addition to the servo controller 6. The servo controller 6 drives the actuators 7A to 7C disposed at each joint axis. Therefore, the slave arm 2 is driven and its moving quantity is detected by the sensors 8A to 8C and fed back to the servo controller 6. As a result, it becomes possible to perform a scale conversion of the motion of the terminal of the master arm 1 and to transmit it to the terminal of the slave arm.

Figure 7:
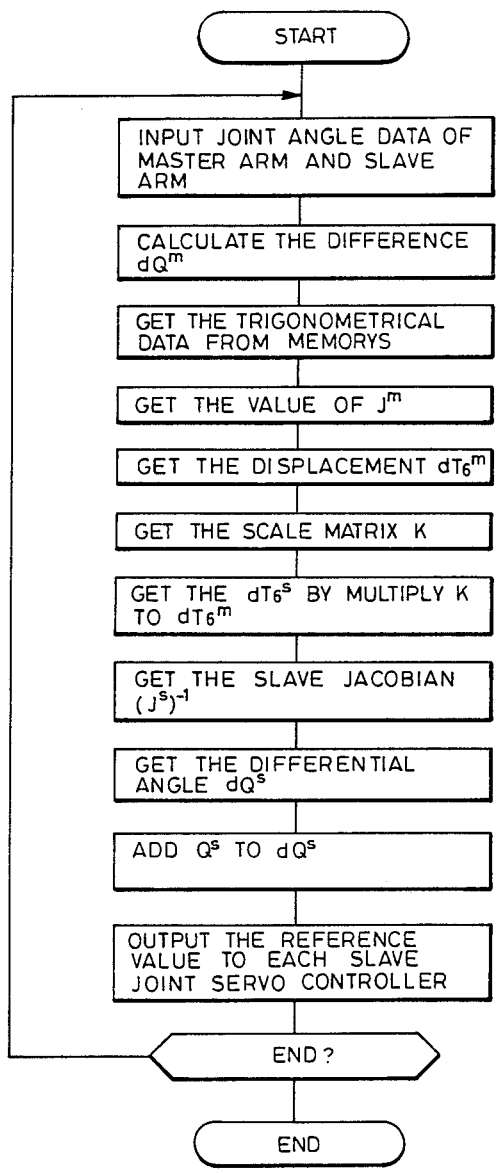
FIG. 7 is a flow chart showing the processing content of the processing device in the apparatus shown in FIG. 6.

The calculating processing operation of the processing device in the embodiment of the controlling apparatus of the invention described above will be explained with reference to FIG. 7.

First of all, the operation is started at the initial position and the initial value of each joint of the master arm 1 is read. Next, the joint angles of the master arm 1 and slave arm 2 are inputted to determine the amount of change $dQ^m$ of the joint angle from the difference from the previous data. Next, the trigonometric function is obtained by referring to the table and the Jacobian matrix $J^m$ of the master arm 1 is calculated. The displacement $dT6^m$ of the terminal of the master arm 1 is determined from the joint angle change quantity $dQ^m$ and from the Jacobian matrix $J^m$. The scale conversion factor K is obtained by use of the input data. The terminal displacement $dT6^m$ is multiplied by K to obtain the terminal displacement $dT6^s$ of the slave arm. Next, the inverse Jacobian matrix $(J^s)^{-1}$ of the slave arm is obtained. Each joint angle displacement $dQ^s$ of the slave arm is obtained by multiplying this displacement $dT6^s$ by $(J^s)^{-1}$ and the sum of the joint angle $Q^s$ and $dQ^s$ of the slave arm is calculated and the result is outputted to each servo system of the slave arm. The procedures described above are repeated till the end of the operation.

Figure 1:
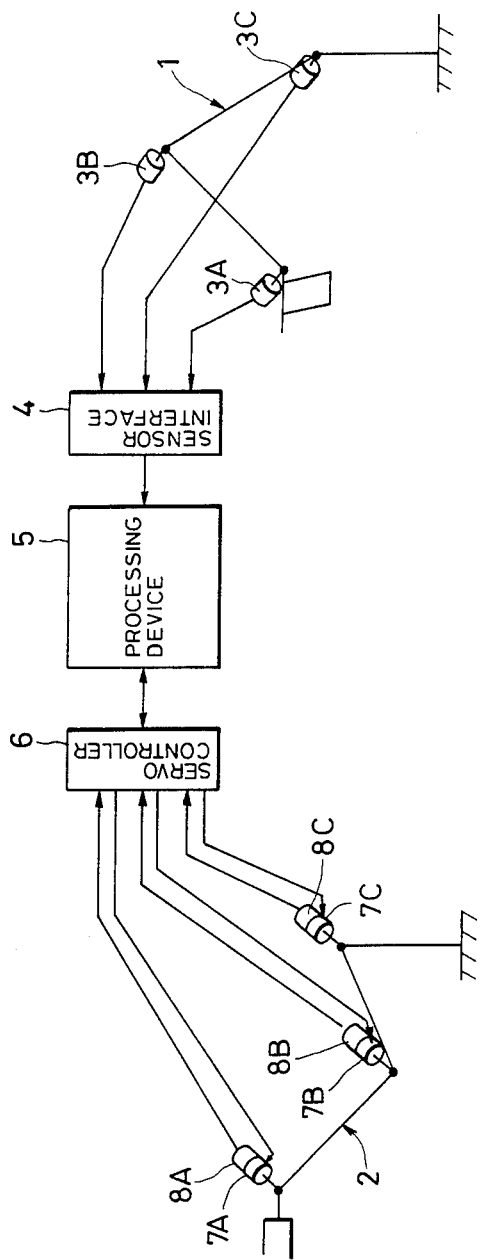
FIG. 1 shows the construction of a controlling apparatus in accordance with one embodiment of the present invention.

In addition to the same effect as that of the embodiment shown in FIG. 1, this embodiment makes it possible to start the operation while the terminals of both master arm 1 and slave arm 2 are in synchronism with one another, at whatever position they may exist. Furthermore, this embodiment can perform an arbitrary scale conversion.

Figure 9:
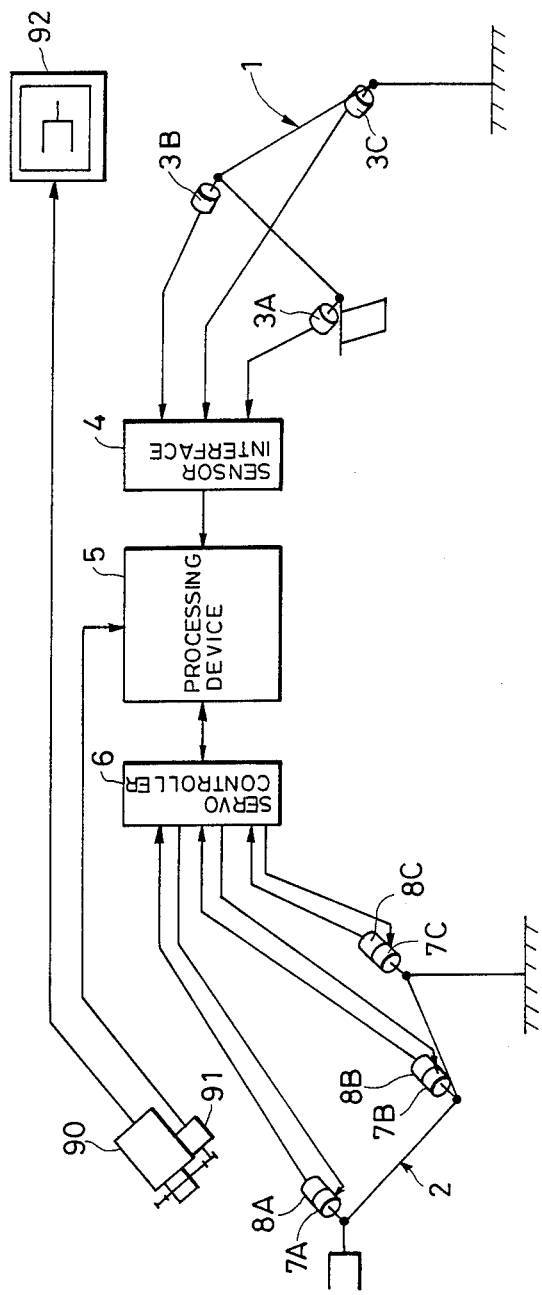
FIG. 9 is a block diagram showing the construction of the apparatus in accordance with still another embodiment of the present invention.

FIG. 9 shows the controlling apparatus in accordance with still another embodiment of the present invention. In the drawing, like reference numerals are used to identify like constituents as in FIG. 9. This embodiment changes the factor of the scale conversion of the motion of the slave arm 2 with respect to the motion of the master arm 1 in accordance with the change of a zooming ratio of a television camera 90 photographing the terminal of the slave arm 2. A sensor 91 is disposed on the television camera 90 to detect the movement of its zoom lens and this sensor information is inputted to the processing device 5. The processing device 5 makes predetermined correction calculation by use of this sensor information to determine the scale conversion matrix K and calculates the reference value for causing the scale conversion motion of the slave arm 2 with respect to the motion of the master arm 1. In FIG. 9, reference numeral 92 represents a television monitor disposed on the side of the master arm 1.

Figure 10:
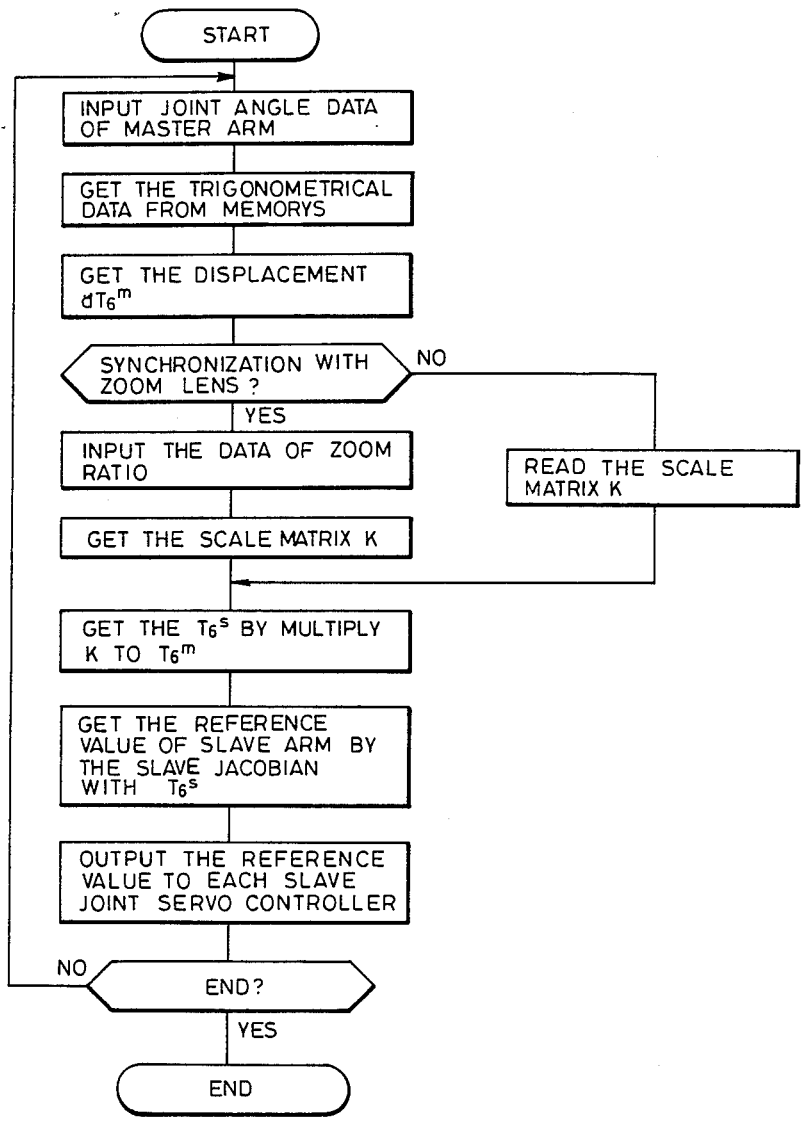
FIG. 10 is a flow chart showing the operation content of the apparatus shown in FIG. 9.

Next, the operation of the apparatus of this embodiment will be explained with reference to the flow chart of FIG. 10.

First of all, the operation is started at the initial position and each joint angle of the master arm 1 is read. Next, the value of the trigonometric function is obtained by referring to the table. The terminal coordinate system $T6^m$ is determined by use of the value of the trigonometric function thus obtained. When the operation is synchronized with the zoom lens of the television camera 10 as described above, the zooming ratio is detected by the sensor 101 fitted to the zoom lens in order to determine the scale conversion matrix K. When it is not synchronized with the zoom lens, a scale conversion matrix K that is inputted in advance is employed. Next, the terminal position $T6^s$ of the slave arm 2 is determined by multiplying the terminal position $T6^m$ of the master arm 1 by K. The reference value of each joint of the slave arm 2 is obtained from this position $T6^s$ by inverse coordinate transformation calculation and outputted to each servo system of the slave arm. The procedures described above are repeated till the end of the operation.

According to the construction described above, the ratio of the motion of the terminal of the master arm 1 to the motion of the video picture of the terminal of the slave arm 2 on the television monitor 11 can be kept always constant even if the zooming ratio of the television camera 10 is changed arbitrarily. As a result, a suitable feel of operation can be obtained always and maneuverability can be improved.

Though the operation on a two-dimensional plane has been described in the foregoing embodiments for the sake of description, the present invention can be applied to the case where the operation is effected in three axial directions, too. Furthermore, the expansion ratio or reduction ratio in the three axial directions can be set freely if the matrix provides the scale conversion factor.

According to the present invention, the motion of the terminal of the master arm can be transmitted to the terminal of the slave arm while the former is being expanded or reduced arbitrarily. Accordingly, the operation of the master arm can be made in the same way when the slave arm effects a fine precision operation or when it effects a rough and large motion. As a result, maneuverability can be improved.

What is claimed is:

1. In a manipulator equipped with a master arm having a plurality of links connected to one another by joints to provide a terminal end which is moveable within a reference coordinate system and a slave arm having a plurality of links connected to one another by joints, a controlling apparatus for controlling said slave arm to follow the motion of said master arm comprising:

position sensors each for sensing a displacement of each of said joints of said master arm and for providing displacement data indicative thereof;

processing means for calculating the position of the terminal end of said master arm in said reference coordinate system on the basis of said displacement data, for executing expansion or reduction scale conversion of the result of said calculation and for determining a reference displacement value for each of said joints of said slave arm on the basis of a scale-converted result of calculation; and servo controller means for controlling each of said joints of said slave arm in accordance with a reference displacement value from said processing means.

2. In a manipulator according to claim 1, wherein said processing means includes:

first calculation means for calculating the position coordinate value of said terminal end in the reference coordinate system of said master arm on the basis of the displacement data from said position sensors;

second calculation means for performing scale conversion by multiplying the position coordinate value of said terminal end of said master arm from said first calculation means by a predetermined scale conversion factor;

third calculation means for calculating the scale-converted position coordinate value of said terminal end in the reference coordinate of said slave arm; and fourth calculation means for converting the scale-converted position coordinate value of the terminal end of said master arm from said second calculation means to reference displacement values for control of said slave arm.

3. In a manipulator according to claim 2, further including means for arbitrarily setting said predetermined scale conversion factor and wherein said second calculation means includes memory means for storing said scale conversion factor.

4. In a manipulator according to claim 2, further including means for changing a zoom ratio of a television camera for photographing a terminal of said slave arm and wherein said second calculation means includes means for setting said scale conversion factor in response to a change in the zoom ratio.

5. In a manipulator equipped with a master arm having a plurality of links connected to one another by joints and a slave arm having a plurality of links connected to one another by joints, a controlling apparatus for controlling said slave arm to follow the motion of said master arm comprising:

position sensors for detecting displacement of said joints of said master arm and for producing the displacement data indicative thereof;

differentiater means for detecting the amount of change in the displacement of each of said joints of said master arm from the displacement data produced by said position sensors;

processing means for calculating the amount of change of a terminal position of said master arm in a reference coordinate system on the basis of the amount of change in the displacement of each of said joints of said master arm detected by said differentiater means, for effecting scale conversion by expanding or reducing the result of calculation and for determining an amount of change of displacement of each of said joints of said slave arm on the basis of said scale-converted result of calculation;

incrementer means for adding the amount of change of displacement of each of said joints of said slave arm from said processing means to a present position of each of said joints of said slave arm and obtaining a reference displacement quantity; and servo controller means for controlling each of said joints of said slave arm in accordance with the reference displacement quantity from said incrementer means.

6. In a manipulator according to claim 5, wherein said processing means includes;
- first calculation means for calculating the amount of change of the coordinate value of the terminal position of the master arm in the reference coordinate system on the basis of the change in the amount of displacement of each of said joints of said master arm;
- second calculation means for performing a scale conversion by multiplying the coordinate value calculated by said first calculation means by a predetermined scale conversion factor; and
- third calculation means for converting the scale-converted coordinate value of said master arm from said second calculation means to a reference displacement quantity for each of said joints of said slave arm.

7. In a manipulator according to claim 6, wherein second calculation means includes memory means for storing a scale conversion factor that can be set arbitrarily.

8. In a manipulator according to claim 6, wherein said second calculation means includes means for setting a scale conversion factor in response to a change of a zooming ratio of a television camera for photographing the terminal position of said slave arm.

9. A processing device for a controlling apparatus of a manipulator, which comprises:
- first calculation means for calculating a coordinate value in a reference coordinate system of a terminal position of a master arm on the basis of displacement data of said master arm;
- second calculation means for performing a scale conversion by multiplying the coordinate value calculated by said first calculation means for predetermined scale conversion factor; and
- third calculation means for converting a scale-converted coordinate value of said master arm received from said second calculation means to a coordinate value of a position of a slave arm.

10. A processing device for a controlling apparatus of a manipulator, which comprises:
- first calculation means for calculating a coordinate value in the reference coordinate system of a terminal end of a master arm on the basis of displacement data relating to the position of said master arm;
- means for changing a zoom ratio of a television camera for photographing a terminal end of a slave arm having a plurality of joints and setting a scale conversion factor;
- second calculation means for producing scale conversion by multiplying the coordinate value received from said first calculation means by said scale conversion factor; and
- third calculation means for converting the scale-converted coordinate value received from said second calculation means to a coordinate value of said slave arm and determining a reference displacement value for each of said joints of said slave arm.

11. A method of controlling a manipulator equipped with a master arm having plural joints and a slave arm having plural joints to control said above arm to follow the motion of said master arm, comprising the steps of:
- sensing displacement of each of the joints of said master arm;
- calculating the position of a terminal end of said master arm in a reference coordinate system;
- executing expansion or reduction scale conversion of the result of calculation of the position of said terminal end;
- determining a reference displacement value for each of said joints of said slave arm; and
- controlling each of said joints of said slave arm in accordance with said determined reference displacement values.

12. A method of controlling a manipulator equipped with a master arm having plural joints and a slave arm having plural joints to control said slave arm to follow the motion of said master arm, comprising the steps of:
- detecting displacement of said joints of said master arm;
- detecting a change in amount of displacement in each of said joints of said master arm;
- calculating an amount of change of a terminal end of said master arm in a reference coordinate system on the basis of a change in displacement of each of said joints of said master arm;
- effecting scale conversion by expanding or reducing the result of calculation of the amount of change of said terminal end;
- determining an amount of change in the displacement of each of said joints of said slave arm;
- adding the amount of change of each of said joints of said slave arm to the position of each of said joints of said slave arm and obtaining a reference displacement quantity; and
- controlling each of said joints of said slave arm in accordance with a reference displacement quantity.

13. A controlling apparatus of a manipulator having a master arm having at least one joint and a slave arm having at least one joint, which comprises:
- means for sensing displacement of each of the joints of said master arm;
- means for calculating a position of a terminal end of said master arm in a reference coordinate system;
- means for executing an expansion or reduction scale conversion of the result of the calculation by said calculating means;
- means for determining a reference displacement value for each of the joints of said slave arm in response to said executing means; and
- means for controlling each of said joints of said slave arm in accordance with reference displacement values from said determining means.

14. A processing device for a controlling apparatus of a manipulator, which comprises:
- means for calculating a terminal position coordinate value in a reference coordinate system of a master arm on the basis of displacement data relating to a position of said master arm;
- means for effecting scale conversion by multiplying the terminal position coordinate value of said master arm received from said calculating means by a scale factor; and
- means for converting the scale-converted coordinate value produced by said scale conversion means to coordinate values representing a position of a slave arm.

15. A processing device for a controlling apparatus of a manipulator, which comprises:
- means for calculating a position of a control member;

means for executing expansion or reduction scale conversion of the result of the calculation by said calculating means and for determining a reference displacement value of a working member on the basis of the scale-converted result.

16. A processing device for a controlling apparatus of a manipulator, which comprises:

means for calculating an amount of change of a position of a control member in a reference coordinate system on the basis of data from a position sensor for detecting displacement of said control member;

means for executing expansion or reduction scale conversion of the result of the calculation by said calculating means and for determining an amount of change of a position of a working member on the basis of the scale-converter result.

17. In a controlling apparatus of a manipulator having a master arm and a slave arm, the improvement comprising:

means for changing a zoom ratio of a television camera for photographing a terminal of said slave arm and setting a scale conversion factor; and means for executing a scale conversion by multiplyign a coordinate value of a position of a master arm by said scale conversion factor, so as to produce a control displacement value to control the position of said slave arm.

18. A controlling apparatus of a manipulator equipped with a master arm and a slave arm which operates while following up the motion of the master arm, comprising:

processing means for effecting conversion matrix calculation to produce expansion or reduction of the value of a calculation result representing information as to the position of the master arm; and control means for controlling the position of said slave arm on the basis of the calculation result by said processing means.

19. A method of controlling of a manipulator equipped with a master arm and slave arm to control said slave arm to follow the motion of said master arm, comprising the steps of:

calculating a position of the master arm upon movement of the master arm;

effecting a scale conversion matrix calculation for producing predetermined expansion or reduction of the value of the result of calculation of the position of the master arm; and outputting the result of said scale conversion matrix calculation to the slave arm to control the position thereof.

* * * * *